United States Patent
Boesch et al.

(10) Patent No.: US 9,121,356 B2
(45) Date of Patent: Sep. 1, 2015

(54) STOP/START CONTROL TO INCREASE MICROHYBRID VEHICLE BATTERY CHARGE

(71) Applicant: Ford Global Technologies, LLC, Dearborn, MI (US)

(72) Inventors: Mathew Alan Boesch, Plymouth, MI (US); George Edmund Walley, Novi, MI (US); Sangeetha Sangameswaran, Canton, MI (US); J. Anthony Lockwood, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 316 days.

(21) Appl. No.: 13/772,791

(22) Filed: Feb. 21, 2013

(65) Prior Publication Data

US 2014/0236459 A1 Aug. 21, 2014

(51) Int. Cl.
*F02D 29/02* (2006.01)
*F02N 11/08* (2006.01)

(52) U.S. Cl.
CPC .............. *F02D 29/02* (2013.01); *F02N 11/084* (2013.01); *F02N 11/0829* (2013.01); *F02N 2200/061* (2013.01); *F02N 2200/123* (2013.01); *Y02T 10/48* (2013.01)

(58) Field of Classification Search
CPC ................ F02D 29/02; F02N 11/0814; F02N 2200/061; F02N 11/084; F02N 11/0829
USPC .............................. 701/112; 123/179.3, 179.4
See application file for complete search history.

(56) References Cited

U.S. PATENT DOCUMENTS

| | | | |
|---|---|---|---|
| 6,621,250 B1 * | 9/2003 | Ohkubo et al. | ................ 320/136 |
| 8,170,737 B2 | 5/2012 | Tate, Jr. et al. | |
| 8,210,293 B2 | 7/2012 | Ang et al. | |
| 2010/0138098 A1 | 6/2010 | Takahara et al. | |
| 2010/0280687 A1 * | 11/2010 | Tate et al. | ........................ 701/22 |

* cited by examiner

*Primary Examiner* — Stephen K Cronin
*Assistant Examiner* — Xiao Mo
(74) *Attorney, Agent, or Firm* — David B. Kelley; Brooks Kushman P.C.

(57) ABSTRACT

A stop/start system of a vehicle autostops and autostarts an engine and, in response to an identification of a drive cycle destination indicating that the vehicle will remain parked for at least a predefined period of time, prevents autostopping of the engine during the drive cycle to increase a state of charge of the battery above a nominal target state of charge.

14 Claims, 2 Drawing Sheets

US 9,121,356 B2

STOP/START CONTROL TO INCREASE MICROHYBRID VEHICLE BATTERY CHARGE

TECHNICAL FIELD

This disclosure relates to micro-hybrid or stop/start vehicles and inhibiting activities associated with engine shutdown prior to vehicle stop.

BACKGROUND

Micro-hybrid vehicles may be equipped with an engine autostop function. This function shuts down the engine during certain periods of operation in order to conserve fuel. For example, the autostop function may be engaged when the vehicle is stopped rather than permitting the engine to idle. The engine may be restarted when the driver releases the brake or actuates the accelerator.

SUMMARY

A stop/start vehicle includes an engine, a battery, and a stop/start system. The stop/start system, in response to an identification of a drive cycle destination for the vehicle, increases a target state of charge for the battery above a nominal target state of charge and controls, during the drive cycle, an automatic stopping and starting of the engine to charge the battery to the increased target state of charge. Controlling, during the drive cycle, an automatic stopping and starting of the engine to charge the battery to the increased target state of charge may include preventing automatic stopping of the engine. The stop/start system may further increase the target state of charge for the battery above the nominal value in response to a drive cycle destination predicted state of charge. The increased target state of charge may be between 80% and 100%.

A method for controlling a stop/start vehicle includes, in response to identifying a drive cycle destination indicating that the vehicle will remain parked for at least a predefined period of time, increasing a target state of charge for a battery above a nominal value generally maintained in the absence of identifying a drive cycle destination indicating that the vehicle will remain parked for at least a predefined period of time, inhibiting automatic stopping of an engine until a state of charge of the battery achieves the increased target state of charge, and automatically stopping and starting the engine to generally maintain the state of charge of the battery at the increased target state of charge. The drive cycle destination indicating that the vehicle will remain parked for at least a predefined period of time may be an airport parking lot. The step of increasing may be further performed in response to a drive cycle destination predicted state of charge being less than a predefined value. The increased target state of charge may be between 80% and 100%.

A stop/start vehicle includes an engine, a battery, and a stop/start system. The stop/start systems autostops and autostarts the engine. The stop/start system further, in response to an identification of a drive cycle destination indicating that the vehicle will remain parked for at least a predefined period of time, prevents autostopping of the engine during the drive cycle to increase a state of charge of the battery above a nominal target state of charge. The drive cycle destination indicating that the vehicle will remain parked for at least a predefined period of time may be an airport parking lot. The stop/start system may be further programmed to prevent autostopping of the engine during the drive cycle in response to a drive cycle destination predicted state of charge being less than a predefined value.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Stop/start or micro-hybrid vehicles are powered by conventional internal combustion engines and equipped with a stop/start system controlling autostop and autostart functions. The stop/start system may autostop the engine when the vehicle is stopped and the engine is not required for propulsion or other purposes. At a later time, the stop/start system may autostart the engine when required for propulsion or other purposes. By disabling the engine when possible, overall fuel consumption is reduced. Unlike true hybrid vehicles, stop/start vehicles are not capable of pure electric propulsion. Furthermore, unlike true hybrid vehicles, stop/start vehicles are not equipped with a traction battery, but rather with a conventional starting, lighting, and ignition (SLI) battery.

Controllers may initiate an autostop or autostart of the engine. As the vehicle comes to a stop, for example, the controllers may issue a command to begin the process to stop the engine, thus preventing the alternator or integrated starter generator from providing electric current to the electrical loads. The battery may provide electric current to the electrical loads while the engine is stopped. As the brake pedal is disengaged (and/or the accelerator pedal is engaged) after an engine autostop, the controllers may issue a command to begin the process to start the engine, thus enabling the alternator or integrated starter generator to provide electric current to the electrical loads.

Figure 1:
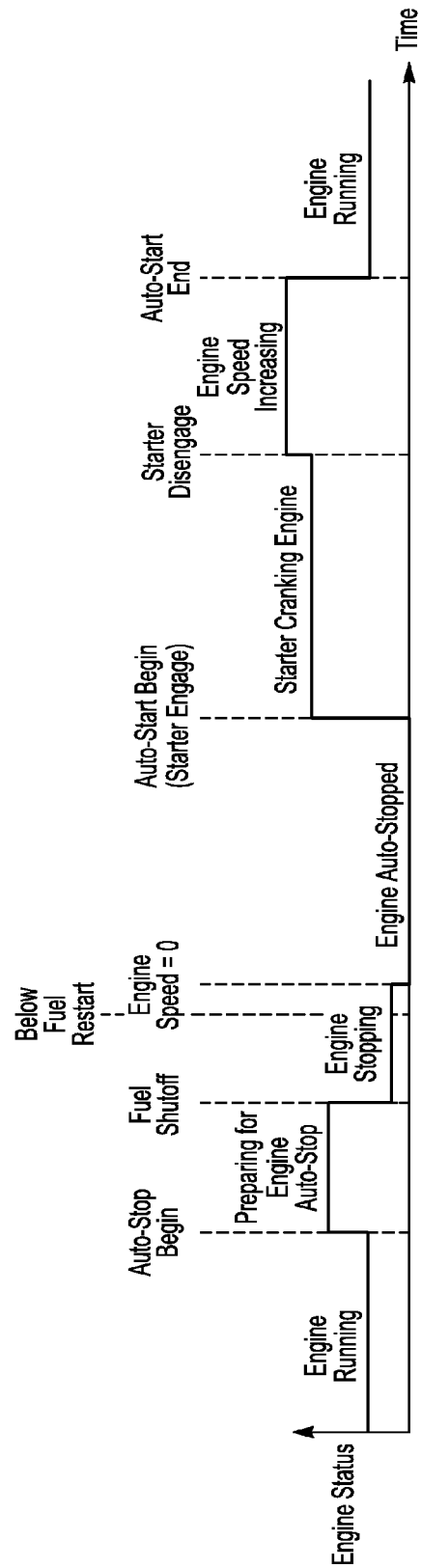
FIG. 1 is a plot illustrating engine status during an autostop.

With reference to FIG. 1, an engine stop/start sequence may include several stages: "auto-stop begin," which marks the beginning of the engine autostop; "preparing for engine auto-stop," which is the time period during which vehicle systems as well as the engine are prepared for the impending engine stop (if an auto stop inhibit condition is detected during this stage, the preparation for the impending engine stop is discontinued and the vehicle systems and engine are returned to their normal operating modes); "fuel shutoff," which marks the point at which fuel flow to the engine is stopped; "engine stopping," which is the time period during which the engine speed is reduced to 0; "below fuel restart," which marks the point after which if a restart is requested to inhibit the auto stop during the "engine stopping" stage, the starter may need to be engaged to crank the engine (if a restart is requested before "below fuel restart" and during the "engine stopping" stage, the engine may be restarted to inhibit the auto stop by turning the flow of fuel back on); "engine speed=0," which marks the point at which the engine speed is near or equal to 0; "engine auto-stopped," which is the time period during which the engine is off; "starter engage," which marks the point at which the starter starts to crank the engine in an effort to start the engine (in response to detecting an engine autostart condition); "starter cranking engine," which is the time period during which the engine is unable to crank under its own power; "starter disengage," which marks the point at which the engine is able to crank under its own power; "engine speed increasing," which is the time period during which the speed of the engine increases to its running speed; and, "auto-start end," which marks the point at which the speed of the engine achieves its running speed (a speed at or above target idle speed).

When a stop/start vehicle engages autostop functionality, active vehicle components or accessories continue to draw power from the SLI battery as mentioned above. Repeated or protracted use of the autostop function can thus reduce the battery state of charge. Stop/start vehicles may have a programmed nominal battery state of charge, such that when the battery state of charge drops below a threshold, the autostop functionality is disabled. As an example, the nominal battery state of charge could be balanced near 80% charge.

When a vehicle is parked for an extended period of time, the vehicle's battery state of charge gradually decreases. Even when the vehicle is off and parked, some vehicle systems continue to draw power from the battery. In extreme circumstances, this can result in the battery retaining insufficient charge to restart the vehicle when the driver returns. It may therefore be beneficial to ensure that a battery is at a high state of charge prior to parking for extended periods. If the battery state of charge is increased above the nominal battery state of charge, for example at or close to 100%, the likelihood of retaining sufficient charge to restart the vehicle upon the driver's return is increased.

Certain systems and methods disclosed herein may achieve and maintain a higher state of charge target by inhibiting or preventing engine autostop events while approaching long-term parking, such as an airport parking lot. The absence of such events provides increased opportunity for the alternator or integrated starter generator, for example, to charge the battery. Once this higher state of charge target is achieved, normal autostop behavior may resume to maintain this higher state of charge.

A controller may utilize inputs from a variety of sensors to reach a determination that the vehicle is approaching a long-term parking location. Once the controller makes a determination that the vehicle final destination is a long-term parking location, the controller may determine whether a predicted battery state of charge upon arrival is sufficient for long-term parking If the controller determines that the predicted battery state of charge is insufficient, the stop/start system may disable the autostop functionality of the engine to increase the battery state of charge above the nominal state of charge. In the absence of a determination that the vehicle is approaching a long-term parking location, the stop/start system may not disable autostop functionality.

Figure 2:
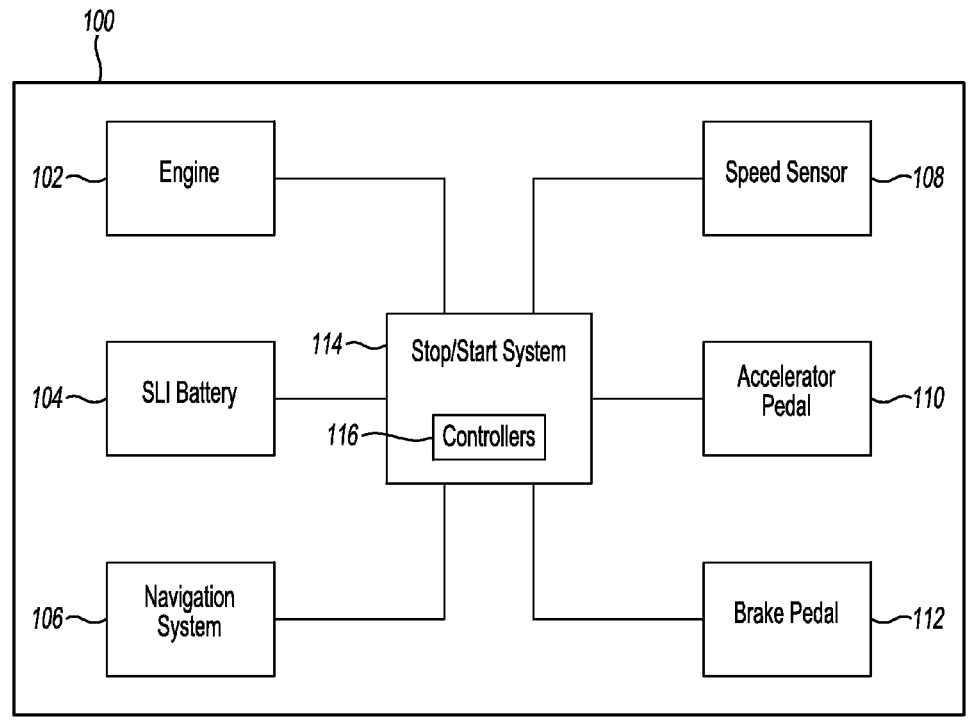
FIG. 2 is a block diagram of a stop/start vehicle.

With reference to FIG. 2, a schematic representation of a vehicle 100 having autostop functionality is shown. The vehicle 100 includes an engine 102, an SLI battery 104, a navigation system 106, a speed sensor 108, an accelerator pedal 110, a brake pedal 112, and at least one controller 114. The engine 102, battery 104, navigation system 106, speed sensor 108, accelerator pedal 110, and brake pedal 112 are all in communication with or under the control of the stop/start system 114, as indicated by solid line. In one configuration, the navigation system 106 may be a manufacturer-installed or aftermarket in-vehicle GPS system. In another configuration, the navigation system 106 may comprise a location-enabled mobile device such as a cellular phone or other standalone GPS unit. Other configurations are, of course, also possible.

The stop/start system 114 includes at least one controller 116 that may issue autostop commands and autostart commands to the engine 102 during vehicle operation. The stop/start system 114, for example, comprises a base autostop/start logic that issues autostop commands and autostart commands—to achieve, among other things, stages similar to that described with reference to FIG. 1—based on signals from at least the speed sensor 108, accelerator pedal 110, and brake pedal 112. In short, the engine 102 will be shut down in response to an autostop command and will be restarted in response to an autostart command.

Figure 3:
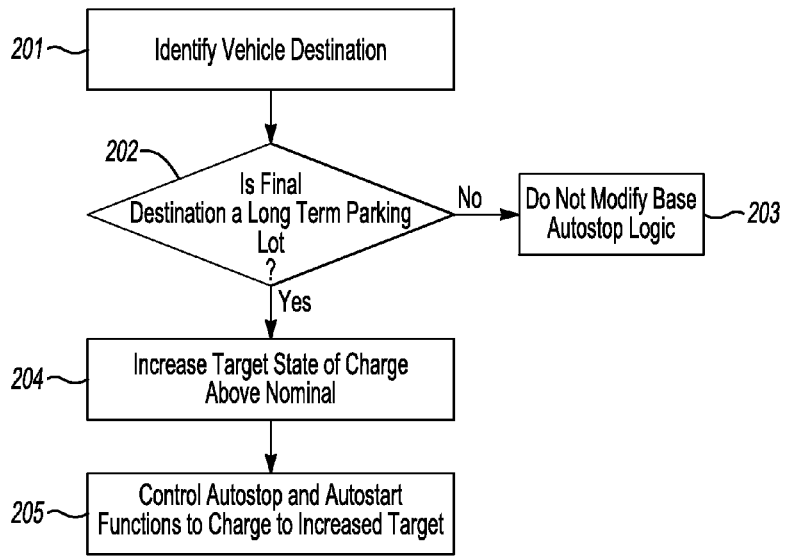
FIG. 3 is a flowchart illustrating an algorithm for controlling a start/stop vehicle.

With reference to FIGS. 2 and 3, the vehicle final drive cycle destination is identified, as illustrated in block 201. In one embodiment, the driver may enter the destination into navigation system 106. In other embodiments, the controllers 116 may predict the vehicle destination based upon current vehicle location and driving history, including the day of the week or time of day. As one having skill in the art will understand, various techniques may be used to determine the final destination of the vehicle. Furthermore, as one having skill in the art will understand, information from other sensors may be used to enhance the location estimation of the car, such as cameras, LIDAR, radar, ultrasonic sensors, linear or angular acceleration signals, or wheel rotation.

As illustrated in block 202, a determination is made of whether the vehicle's destination is a long-term parking lot. This determination may be performed by controllers 116. The determination step may, for example, comprise detecting metadata associated with a Point of Interest input by a driver into navigation system 106, where the metadata indicates that the Point of Interest is a long-term parking location. In another configuration, the determination step may comprise a comparison of the location input in block 201 with a database comprising the addresses of known long-term parking locations.

If a determination is made that the vehicle's final destination is not a long-term parking lot, then the base autostop/start logic is not modified, as shown in block 203. If a determination is made that the vehicle's final destination is a long-term parking lot, then the target state of charge may be increased above nominal, as illustrated in block 204. After the target state of charge is increased, the autostop and autostart functions are controlled to increase the battery state of charge towards the new target, as illustrated in block 205.

In some embodiments, after making a determination that the final vehicle destination is a long-term parking lot, a prediction is made of the state of charge of the battery 104 upon arrival at the destination. The controllers 116 may make this prediction based upon a comparison of the vehicle's current location, as may be reported by the navigation system 106, with the final destination as determined in block 201, and an estimate of the battery usage needed to reach the final destination. This estimate could be based on historical data. If, for example, state of charge decreases at a rate of 1% per 5 miles and the vehicle is 15 miles away from its final destination, 3% could be subtracted from the current state of charge to predict the state of charge of the battery 104 upon arrival at the final destination. Any suitable predication technique, however, could be used.

After the state of charge prediction is made, a determination is made of whether the predicted state of charge is sufficient for long-term parking The controllers 116 may perform this step by determining whether the predicted state of charge meets or exceeds a calibratable state of charge threshold (determined by testing, simulation, etc.) This calibratable state of charge threshold is above the nominal state of charge, and may be set, for example, to a state of charge level between 80% and 100%. If the controllers 116 determine that the predicted state of charge meets or exceeds the increased threshold for long-term parking, then the base autostop/start logic is not modified. If a determination is made that the predicted state of charge does not meet or exceed the increased threshold for long-term parking, then the autostop function is inhibited during the vehicle's drive to the destination in order to increase the battery state of charge. The inhibition of the autostop function may be performed by the stop/start system 114.

In some embodiments, multiple stop/start control modes are implemented. A first mode may be used to control the engine to maintain a nominal state of charge. In response to an identified vehicle final destination at a long-term parking location, a second mode may be used to control the engine to increase the state of charge above the nominal state of charge.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic data tape storage, optical data tape storage, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers, or any other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A stop/start vehicle comprising:
   an engine;
   a battery having a nominal target state of charge; and
   a stop/start system programmed to, in response to an identification of a drive cycle destination for the vehicle, increase the target state of charge for the battery above the nominal and control, during the drive cycle, an automatic stopping and starting of the engine to charge the battery to the increased target state of charge.

2. The vehicle of claim 1, wherein controlling, during the drive cycle, an automatic stopping and starting of the engine to charge the battery to the increased target state of charge includes preventing automatic stopping of the engine.

3. The vehicle of claim 1, wherein the stop/start system is further programmed to increase the target state of charge for the battery above the nominal in response to a drive cycle destination predicted state of charge.

4. The vehicle of claim 1, wherein the increased target state of charge is between 80% and 100%.

5. A method for controlling a stop/start vehicle comprising:
   in response to identifying a drive cycle destination indicating that the vehicle will remain parked for at least a predefined period of time,
      increasing a target state of charge for a battery above a nominal value generally maintained in the absence of identifying a drive cycle destination indicating that the vehicle will remain parked for at least a predefined period of time,
      inhibiting automatic stopping of an engine until a state of charge of the battery achieves the increased target state of charge, and
      automatically stopping and starting the engine to generally maintain the state of charge of the battery at the increased target state of charge.

6. The method of claim 5, wherein the drive cycle destination indicating that the vehicle will remain parked for at least a predefined period of time is an airport parking lot.

7. The method of claim 5, wherein the step of increasing is further performed in response to a drive cycle destination predicted state of charge being less than a predefined value.

8. The method of claim 5, wherein the increased target state of charge is between 80% and 100%.

9. A stop/start vehicle comprising:
   an engine;
   a battery having a nominal target state of charge; and
   a stop/start system programmed to autostop and autostart the engine and to, in response to an identification of a drive cycle destination indicating that the vehicle will remain parked for at least a predefined period of time, prevent autostopping of the engine during the drive cycle to increase a state of charge of the battery above the nominal.

10. The vehicle of claim 9, wherein the drive cycle destination indicating that the vehicle will remain parked for at least a predefined period of time is an airport parking lot.

11. The vehicle of claim 9, wherein the stop/start system is further programmed to prevent autostopping of the engine during the drive cycle in response to a drive cycle destination predicted state of charge being less than a predefined value.

12. The vehicle of claim 1, wherein the identification of a drive cycle destination for the vehicle is based on a driver-selected destination.

13. The method of claim 5, wherein identifying a drive cycle destination indicating that the vehicle will remain parked for at least a predefined period of time is based on a driver-selected destination.

14. The vehicle of claim 9, wherein the identification of a drive cycle destination indicating that the vehicle will remain parked for at least a predefined period of time is based on a driver-selected destination.

* * * * *